US010139639B2

(12) United States Patent
Wei (10) Patent No.: US 10,139,639 B2
(45) Date of Patent: Nov. 27, 2018

(54) DISPLAY PANEL AND DISPLAY DEVICE (71) Applicant: BOE Technology Group Co., Ltd., Beijing (CN)

(72) Inventor: Wei Wei, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 128 days.

(21) Appl. No.: 14/913,021

(22) PCT Filed: Apr. 22, 2015

(86) PCT No.: PCT/CN2015/077149
§ 371 (c)(1),
(2) Date: Feb. 19, 2016

(87) PCT Pub. No.: WO2016/119318
PCT Pub. Date: Aug. 4, 2016

(65) Prior Publication Data
US 2016/0349523 A1    Dec. 1, 2016

(30) Foreign Application Priority Data
Jan. 28, 2015    (CN) .......................... 2015 1 0043969

(51) Int. Cl.
G02B 27/22    (2018.01)
G02B 27/00    (2006.01)

(52) U.S. Cl.
CPC ..... G02B 27/2214 (2013.01); G02B 27/0025 (2013.01)

(58) Field of Classification Search
CPC .... G02B 27/22–27/2214; G02B 5/18–5/1895; H04N 1/00–1/00997
See application file for complete search history.

(56) References Cited

U.S. PATENT DOCUMENTS 6,011,650 A * 1/2000 Parker ....................... B44F 1/14
283/86
6,215,499 B1 4/2001 Neff et al.
(Continued)

FOREIGN PATENT DOCUMENTS

CN    1856720 A    11/2006
CN    101341760 A    1/2009
(Continued)

OTHER PUBLICATIONS

First Office Action, including Search Report, for Chinese Patent Application No. 201510043969.1, dated Jul. 29, 2016, 7 pages.
(Continued)

Primary Examiner — Bumsuk Won
Assistant Examiner — Jeffrey Madonna
(74) Attorney, Agent, or Firm — Westman, Champlin & Koehler, P.A.

(57) ABSTRACT

The present disclosure provides a display panel and a display device. The display panel includes a curved substrate having a first curvature and a curved grating layer corresponding to the curved substrate and having a second curvature, wherein light that is emitted into the display panel is converged by means of the curved substrate having the first curvature and the curved grating layer corresponding to the substrate and having the second curvature, so as to reduce crosstalk between view images. Further, focusing effect of the view images viewed can be improved such that stereoscopic effect of the view image viewed is much more excellent as the distance between each point of the curved substrate and each point of the curved grating layer along the viewing direction is equal to the focal length for the grating structure.

8 Claims, 6 Drawing Sheets

(56) References Cited

U.S. PATENT DOCUMENTS

| | | | |
|---|---|---|---|
| 6,748,684 B1* | 6/2004 | Bar-Yona | G09F 11/00 40/437 |
| 7,876,397 B2 | 1/2011 | Krijn et al. | |
| 8,493,379 B2 | 7/2013 | Karman et al. | |
| 8,558,961 B2 | 10/2013 | Yun et al. | |
| 8,614,771 B2 | 12/2013 | Hong et al. | |
| 9,230,465 B2 | 1/2016 | Li et al. | |
| 2004/0120048 A1 | 6/2004 | Laverty | |
| 2005/0180006 A1* | 8/2005 | Mendoza | G02B 27/2214 359/463 |
| 2006/0256436 A1* | 11/2006 | Javidi | G02B 27/2214 359/466 |
| 2007/0014023 A1* | 1/2007 | Pezzaniti | G02B 3/0031 359/626 |
| 2009/0161048 A1* | 6/2009 | Satake | G02F 1/133305 349/110 |
| 2015/0070478 A1 | 3/2015 | Wei | |
| 2016/0021367 A1* | 1/2016 | Yoon | H04N 13/324 348/59 |

FOREIGN PATENT DOCUMENTS

| | | |
|---|---|---|
| CN | 101349817 A | 1/2009 |
| CN | 102395039 A | 3/2012 |
| CN | 102681181 A | 9/2012 |
| CN | 102681185 A | 9/2012 |
| CN | 202749067 U | 2/2013 |
| CN | 203191638 U | 9/2013 |
| CN | 103424874 A | 12/2013 |
| DE | 297 03 342 U1 | 9/1997 |
| EP | 1198787 A1 | 4/2002 |
| JP | 5215498 B1 | 3/2013 |
| KR | 10-2005-0093930 A | 9/2005 |

OTHER PUBLICATIONS

Third Office Action, including Search Report, for Chinese Patent Application No. 201510043969.1, dated Dec. 14, 2016, 12 pages.

Fourth Office Action for Chinese Patent Application No. 201510043969.1, dated Mar. 7, 2017, 11 pages.

Rejection Decision from Chinese Patent Application No. 201510043969.1, dated Jul. 4, 2017, 10 pages.

International Search Report and Written Opinion for International Patent Application No. PCT/CN2015/077149, dated Oct. 29, 2015, 9 pages.

English translation of Box No. V from the Written Opinion of the International Search Report for International Patent Application No. PCT/CN2015/077149, 2 pages.

Second Office Action for Chinese Patent Application No. 201510043969.1, dated Oct. 18, 2016, 7 pages.

* cited by examiner

DISPLAY PANEL AND DISPLAY DEVICE

CROSS-REFERENCE TO RELATED APPLICATIONS

This application is a Section 371 National Stage Application of International Application No. PCT/CN2015/077149, filed Apr. 22, 2015, entitled "Display panel and display device", which claims priority to Chinese Application No. 201510043969.1, filed on Jan. 28, 2015, incorporated herein by reference in their entirety.

BACKGROUND

1. Technical Field

The present invention relates to technical field of display, and particularly to a display panel and a display device.

2. Description of the Related Art

Currently, common naked eye 3D display is substantially classified into two types, parallax barrier type and lenticular grating type, whose mainly basic working principle is designed to divide a frame into two images at different viewing angles adapted to be viewed by left eye and right eye respectively. A plurality of left-viewing areas and right-viewing areas spaced from each other are presented to a user under the action of the parallax barrier or the lenticular grating 102 to these sub-pixel units 101.

Figure 1:
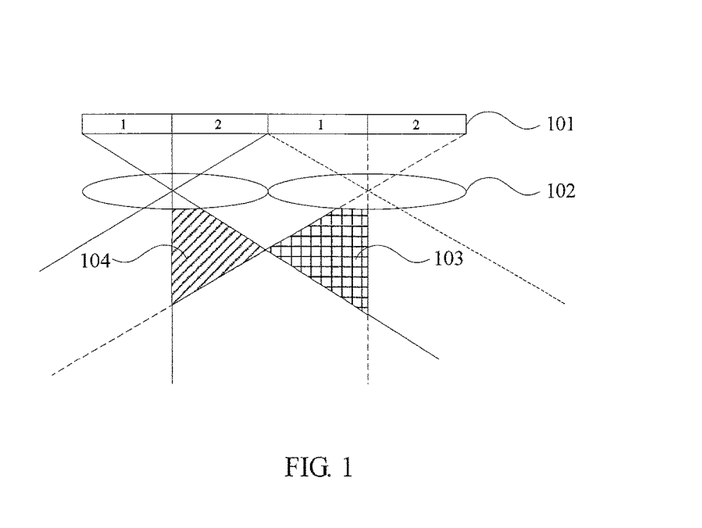
FIG. 1 is a schematic diagram of viewing angles for a multi-view-point display panel in prior art.

When a user's left eye is located in the left-viewing area and his right eye is located in the right-viewing area opposite to the left-viewing area, the user's left eye will watch the left-eye image and his right eye will watch the right-eye image. The left-eye image and the right-eye image are of a stereo image pair and can be amalgamated in brain into a 3D image, that is, the user thus enjoy a 3D stereoscopic image. However, when a two-viewing-point display is used, a user usually stands in a "dead-area" for 3D display, that is, the user's left eye falls into the right-viewing area 103 while his right eye falls into the left-viewing area 104. At this moment, his left eye watches the right-eye image while his right eye watches the left-eye image, as shown in FIG. 1. Thus, the user cannot watch any 3D stereo images and even is subject to crosstalk among the view images.

In a word, the conventional flat plate-type naked eye 3D displaying technology encounters a problem of crosstalk among view images.

SUMMARY

Embodiments of the present invention provide a display panel and a display device, which provide in advance a substrate having a first curvature and a grating corresponding to the substrate and having a second curvature, to converge view images displayed in the display panel, so as to reduce crosstalk among the view images.

An embodiment of the present invention provides a display panel, and the display panel comprises: a curved substrate having a first curvature and a curved grating layer corresponding to the curved substrate and having a second curvature, wherein, view images displayed by the display panel are converged by providing in advance the curved substrate having the first curvature and the curved grating having the second curvature, so as to reduce crosstalk among various view images.

Preferably, a radian of the curved substrate is equal to that of the curved grating layer. Alternatively, the second curvature is greater than the first curvature.

By provision of the curved grating layer that is parallel to the curved substrate, i.e., the radian of the curved substrate is equal to that of the curved grating layer, constant distance from each point of the curved substrate to each point of the curved grating layer along a viewing direction is achieved, thus, the viewing effect of the view images is improved.

Preferably, the curved substrate includes a plurality of sub-pixel sets arranged repeatedly, and the curved grating layer includes a plurality of grating structures arranged repeatedly, wherein each of the plurality of grating structures corresponds to a respective one of the plurality of sub-pixel sets;

a distance between the curved substrate and the curved grating layer is equal to focal length for the grating structure.

Focusing effect of the view images viewed is further improved and thus stereos effect of watching multiple view images is rather excellent as the distance from each point of the curved substrate to each point of the curved grating layer along the viewing direction is equal to focal length for the grating structure.

Preferably, the first curvature is in an inverse proportion to a preset distance between the user and the curved substrate.

Preferably, the second curvature is in an inverse proportion to a preset distance, wherein the preset distance is a difference between the preset distance from the user to the curved substrate and the focal length for the curved grating layer.

Preferably, the grating structure includes two curved sides having a second curvature and, two linear sides in connection with the curved sides end to end to form a close structure;

a length of the curved side of the grating structure is in a direct proportion to a distance within which the user can freely move in a horizontal direction with the view images being visible.

Preferably, each of the sub-pixel sets includes at least two sub-pixel units for displaying the view images, wherein, the sub-pixel unit includes two curved sides having the first curvature and, two linear sides that are in connection with the curved sides, end to end, to form a closed structure;

summation of the lengths of the curved sides of the sub-pixel units in the sub-pixel set is in a direct proportion to the length of the curved side of the grating structure.

Preferably, the number of the view images that are displayed by the curved substrate is in direct proportion to the distance within which the user can freely move in the horizontal direction with the view images being visible.

An embodiment of the present invention provides a display device comprising the above display panel.

The crosstalk among various view images is thus reduced by, providing in advance the curved substrate having the first curvature and the curved grating layer having the second curvature in the display panel to converge the view images displayed by the display panel.

DETAILED DESCRIPTION

Embodiments of the present invention provide a display panel and a display device, which provide in advance a curved substrate having a first curvature and a curved grating layer having a second curvature, to converge the view images displayed by the display panel, so as to reduce crosstalk among various view images.

Technical solutions in embodiments of the present invention will be described hereinafter clearly and completely in the way of embodiments with reference to the attached drawings. Obviously, the illustrated embodiments are some of embodiments of the present invention, rather than being construed as all of embodiments of the present invention. Based on the described embodiments of the present invention, any others embodiments obtained by those skilled in the art without inventive labor fall into the scope of the present invention.

Figure 2A:
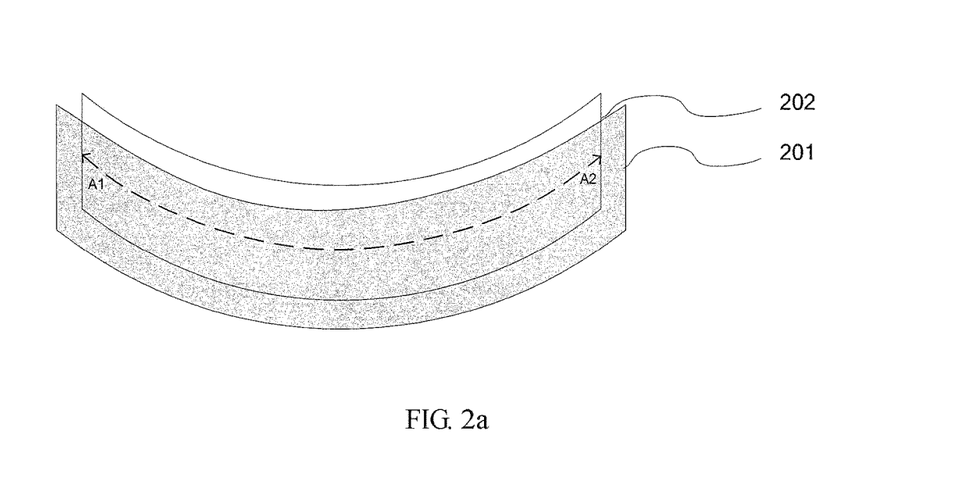
FIG. 2a is a schematic structural view of a display panel according to an embodiment of the present invention.

As shown in FIG. 2a, there is provided a display panel according to an embodiment of the present invention. The display panel includes a curved substrate 201 having a first curvature and a curved grating player 202 corresponding to the curved substrate and having a second curvature. The second curvature may be larger than the first curvature.

Figure 2B:
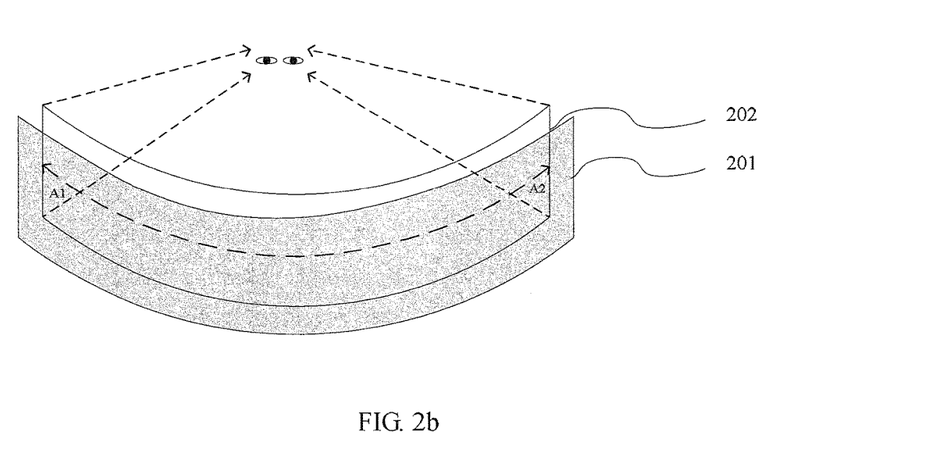
FIG. 2b is a schematic diagram showing a displaying effect of the display panel according to the embodiment of the present invention.

By means of the curved substrate having the first curvature and the curved grating player corresponding to the curved substrate and having the second curvature, light emitted by the display panel is converged, thereby reducing crosstalk among images at various points of sight. FIG. 2b specifically shows the displaying principle.

Specifically, a radian of the curved substrate is equal to that of the curved grating layer.

Figure 3A:
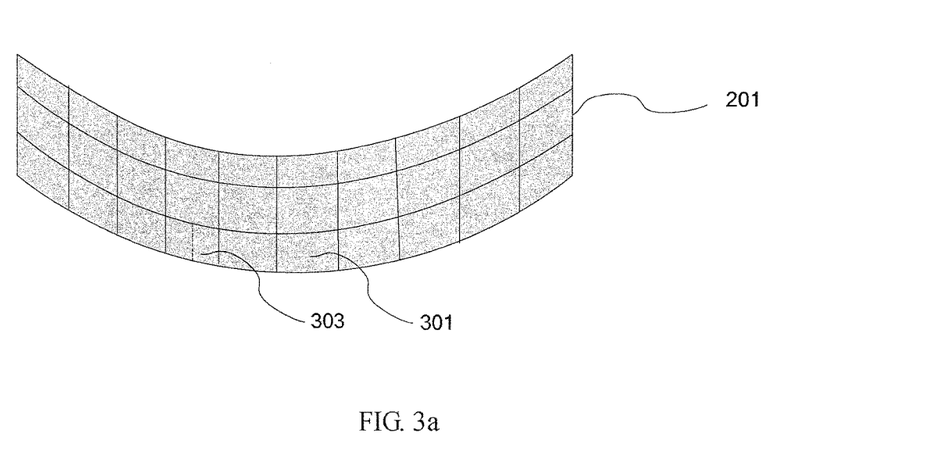
FIG. 3a is a schematic structural view of a curved substrate according to an embodiment of the present invention.

In this embodiment, the curved substrate 201 includes a plurality of sub-pixel sets 301 that are repeatedly arranged for displaying at least one view image, each of the plurality of sub-pixel sets comprising at least two sub-pixel units 303 for displaying the view images, as shown in FIG. 3a; wherein, the sub-pixel units 303 each include two curved sides having a first curvature and two linear sides that are in connection with the curved sides end to end to form a close structure. Thus, each of the sub-pixel sets 301 includes two curved sides constituted by the curved sides of the sub-pixel unit, and two linear sides that are in connection with the curved sides end to end. In this instance, a length of the curved sides of each of the sub-pixel sets is a summation of lengths of the curved sides of the sub-pixel units in the sub-pixel set.

Figure 3B:
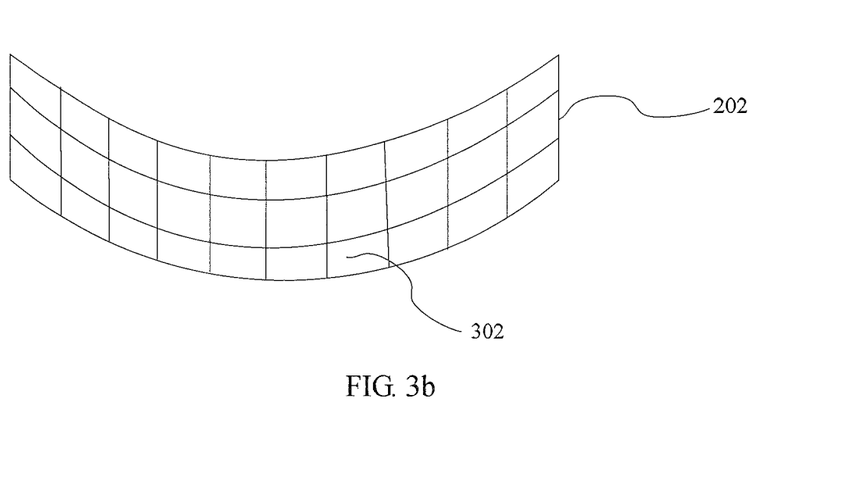
FIG. 3b is a schematic structural view of a curved grating layer according to an embodiment of the present invention.

The curved grating layer 202 includes a plurality of grating structures 302 that are repeatedly arranged, in which each of the grating structures 302 corresponds to a respective one of the sub-pixel sets 301, as shown in FIG. 3b. In this embodiment, each of the grating structures 302 includes two curved sides having the second curvature and two linear sides that are in connection with the curved sides end to end to form a close structure.

Specifically, a distance between the curved substrate and the curved grating layer is equal to focal length for the grating structure.

Figure 4A:
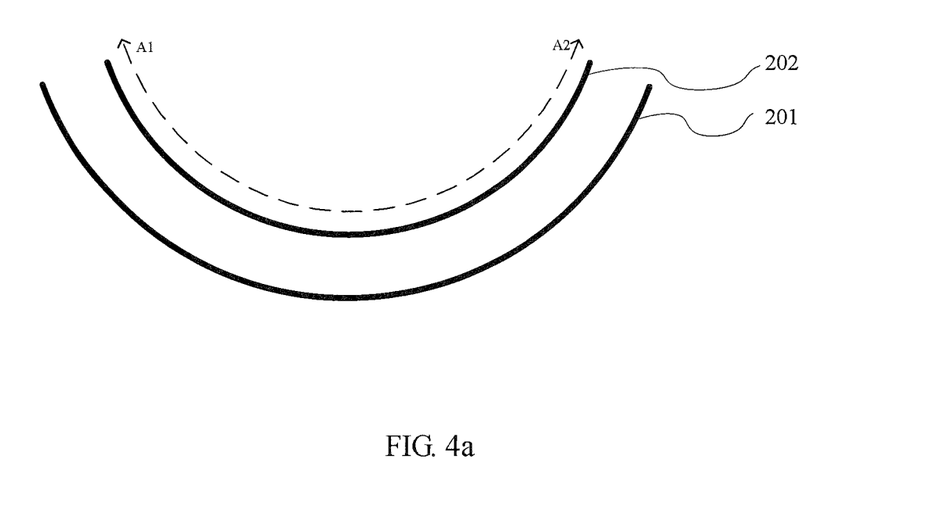
FIG. 4a is a sectional view of the display panel according to the embodiment of the present invention, along an A1-A2 direction.
Figure 4B:
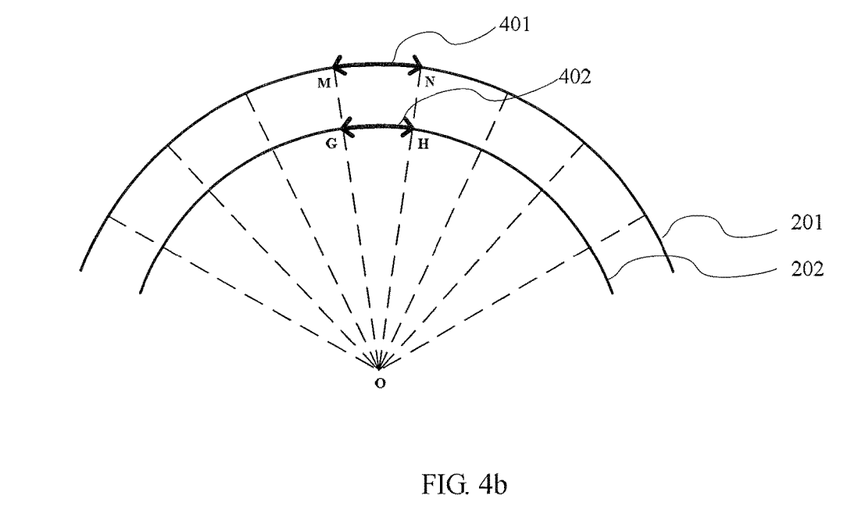
FIG. 4b is another sectional view of the display panel according to the embodiment of the present invention, along the A1-A2 direction.

In order to obtain better understanding of the curved substrate 201 and curved grating layer 202 as described in the embodiment of the present invention, a sectional view of the display panel, namely FIG. 4a, is shown in which the display panel in FIG. 2 is dissected along A1-A2 direction, by cutting open the curved grating layer 202 along the curved side having the first curvature of the curved substrate 201 and cutting open the curved grating layer 202 along the curved side having the second curvature of the curved grating layer 202. A sectional view of the display panel as shown in FIG. 4b is obtained by perpendicularly inversing the sectional view as shown in FIG. 4a, for convenience of the description.

In this embodiment, the curved side 401 of the sub-pixel set 301 has a first curvature of k1 and the curved side 402 of the grating structure 302 has a second curvature of k2. As the radian of the curved substrate 201 is equal to that of the curved grating layer 202, a center of a circle corresponding to the curved side 401 and a center of a circle corresponding to the curved side 402 are one same center O of a circle. In this instance, a radius r1 of curvature of the curved side 401 may be a linear section ON or a linear section OM, and a radius r2 of curvature of the curved side 402 may be a linear section OH or a linear section OG. The radius r1 of curvature of the curved side 401 may be a preset distance d from a user to the curved substrate 201 and the radius r2 of curvature of the curved side 402 may be a difference between the preset distance d from the user to the curved substrate 201 and the focal length f for the grating structure 302.

As the curved side 401 and the curved side 402 are parallel to each other, according to Parallel Theorem, a ratio of curved line section GH to curved line section MN is equal to that of the line section OH to the line section ON, or, the ratio of curved line section GH to curved line section MN is equal to that of the line section OG to the line section OM, wherein the line sections ON and OM are both the preset distance d from the user to the curved substrate 201, and the line sections OH and OG are both equal to the difference between the line section ON and the line section OH, i.e., the difference between the preset distance d from the user to the curved substrate 201 and the focal length f for the grating structure 302.

$$GH/MN=(d-f)/r1=(d-f)/r1. \qquad \text{Formula 1.}$$

Figure 5:
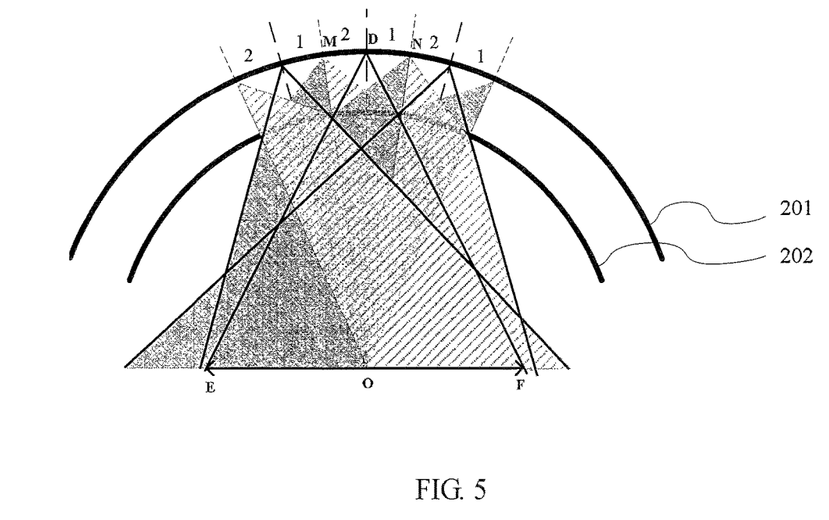
FIG. 5 is a schematic diagram showing a displaying effect of the curved substrate, which displays two view images, according to an embodiment of the present invention.

As for a curved substrate that is in support of displaying of two view images, i.e., each of the sub-pixel sets 301 includes a first sub-pixel unit for displaying a first view image and a second sub-pixel unit for displaying a second view image, displaying effect of such curved substrate is shown in FIG. 5, in which the first sub-pixel unit is denoted by 1, the second sub-pixel unit is denoted by 2, and, the first view image is visible in grey shaded area while the second view image is visible in oblique-line shaded area. In order to ensure that a user can watch not only the first view image but also the second view image, he has to move within the line section MN in horizontal direction, and moreover, it has to ensure that the user's left eye is moved within the line section EO in horizontal direction while his right eye is moved within the line section FO in horizontal direction.

Figure 6:
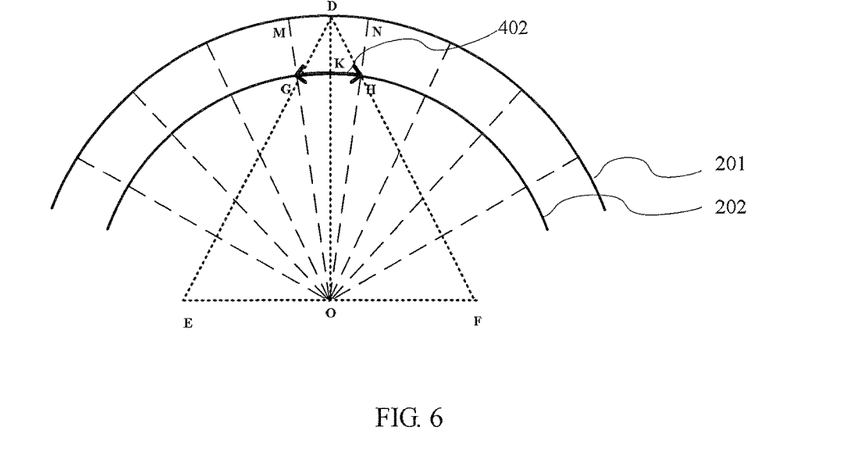
FIG. 6 is a schematic structural diagram of the curved substrate, which displays two view images, according to the embodiment of the present invention.

As shown in FIG. 5, the curved side MN of the sub-pixel set includes a curved side DN of the first sub-pixel unit and a curved side DM of the second sub-pixel unit. FIG. 6 is a diagram of FIG. 5 in simplified way, in which point D is connected with point O and thus the line section OD intersects the curved side 402 at intersection point of point K.

As the curvature of the curved side 402 is very small, the curved line GH may be approximated to a linear line section. It is known according to Parallel Theorem in triangle that a ratio of the curved line section GH to the line section EF is equal to a ratio of the line section DK to the line section DO, in which the minimum distance DK between the curved substrate and the curved grating layer is equal to the focal length f for the grating structure, the line section OD is a radius r1 of curvature of the curved side 401, i.e., the preset distance d between the user and the curved substrate 201, and the line section EF is the preset distance d within which the user may freely move in horizontal direction with the view images being visible by the user. That is, it is obtained the following formula.

$$GH/b = f/d \qquad \text{Formula 2.}$$

As for a curved substrate that is in support of displaying of two view images and in which length of the curved line section MN is a sum of a length of the curved side of the first sub-pixel unit and a length of the curved side of the second sub-pixel unit, and as the length of the curved side of the first sub-pixel unit is equal to the length of the curved side of the second sub-pixel unit, it is obtained that the curved line section MN is two times in length of the curved side of the sub-pixel unit. According to Formula 1 and Formula 2, the length of the curved line section GH and the focal length f for the grating structure may be obtained. The curvature radius r2 of the curved side 402 is equal to the difference between the focal length f for the grating structure and the radius r1 of curvature of the curved side 401.

In summary, the curved side of the curved substrate 201 may be determined based on the curved line section MN and the first curvature, and the curved side of the curved grating layer 202 may be determined based on the curved line section GH and the second curvature.

Figure 7:
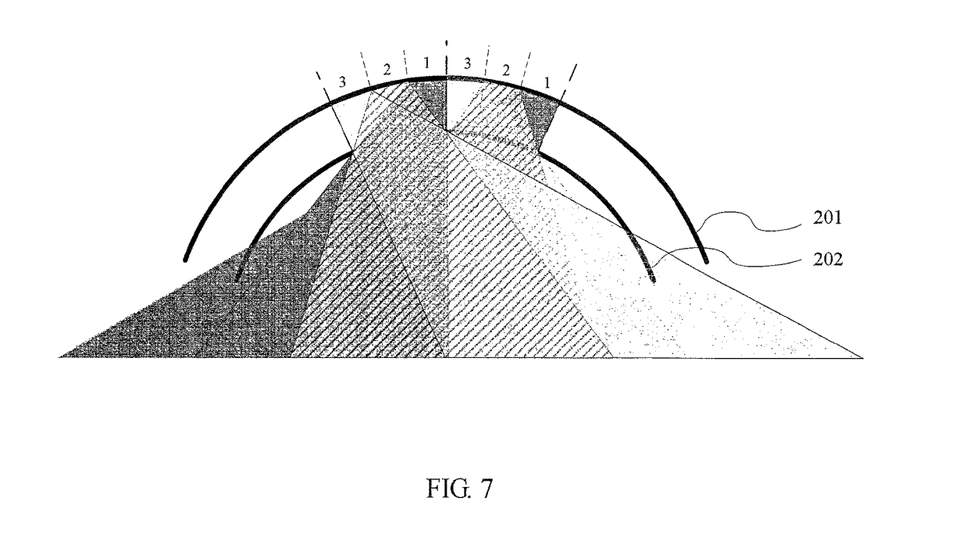
FIG. 7 is a schematic diagram showing a displaying effect of the curved substrate, which displays three view images, according to an embodiment of the present invention.
Figure 8:
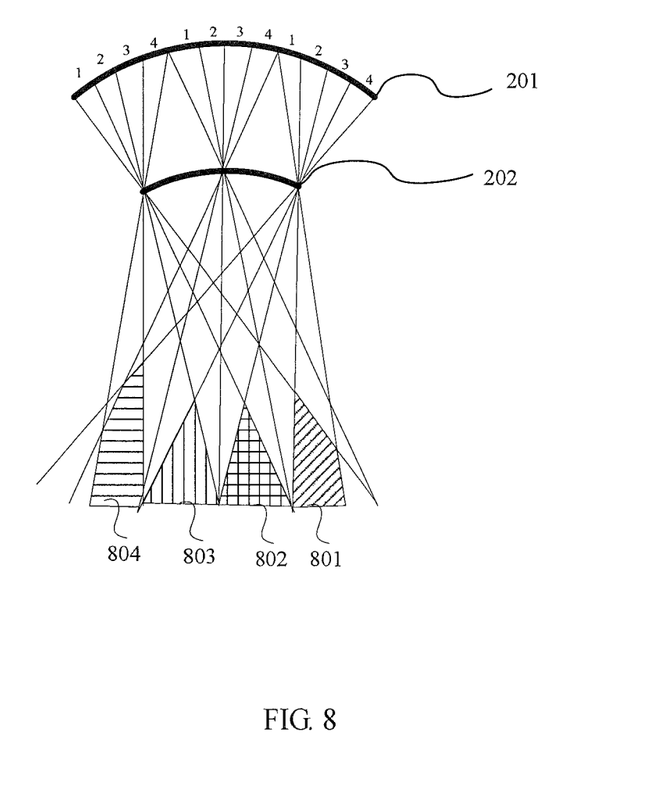
FIG. 8 is a schematic diagram showing a displaying effect of the curved substrate, which displays four view images, according to an embodiment of the present invention.

As for a curved substrate that is in support of displaying of three view images or a curved substrate that is in support of displaying of four view images, the displaying effect and the ratio relationship are similar to those of the curved substrate that is in support of displaying of two view images as described above and thus will not described repeatedly. The displaying effect of the curved substrate that is in support of displaying of three view images is illustrated in FIG. 7, in which, first view image is visible within black shaded area, second view image is visible within oblique-line shaded area, and third view image is visible within grey shaded area. FIG. 8 shows displaying effect of a curved substrate that is in support of displaying of four view images, in which, first view image is visible within area 801, second view image is visible within area 802, third view image is visible within area 803, and fourth view image is visible within area 804.

Specifically, the number of view images that is in support of being displayed by the substrate is in a direct proportion to the preset distance EF within which the user may move freely in the horizontal direction.

According to the present invention, the number of view images that is in support of being displayed by the substrate is obtained by rounding off a ratio of the preset distance EF within which the user may move freely in the horizontal direction to a standard spacing between eye pupils of human.

Specifically, the curved grating layer 202 may be a solid barrier grating and/or an active barrier grating and/or a lenticular grating and/or an electronic liquid crystal lens (ELC).

According to an embodiment of the present invention, there is provided a display device comprising the above display panel.

Specifically, the display device may be a liquid display or a plasma panel display.

In summary, a display panel and a display device are provided according to embodiments of the present invention, in which a substrate having a first curvature and a grating corresponding to the substrate and having a second curvature is provided in advance, to converge view images displayed in the display panel, so as to reduce crosstalk among the view images; by provision of the curved grating layer that is parallel to the curved substrate, i.e., the radian of the curved substrate is equal to that of the curved grating layer, constant distance from each point of the curved substrate to corresponding point of the curved grating layer along a viewing direction is achieved, thus, visual effect of the view images is improved; and, focusing effect of the view image viewed is further improved such that stereoscopic effect of the view image viewed by the user is much more excellent as the minimum distance between the curved substrate and the curved grating layer along the viewing direction is equal to the focal length for the grating structure.

Obviously, various modifications and variants of the present invention can be obtained by those skilled in the art without departing from the spirit and scope of the present invention. Thus, the present invention also intends to cover those modifications and variants provided that they were contained within the scope of the claims of the present invention and its equivalence.

What is claimed is:

1. A display panel, comprising: a curved substrate having a first curvature, and a curved grating layer corresponding to the curved substrate and having a second curvature,
   wherein, light that is emitted into the display panel is converged by means of the curved substrate having the first curvature and the curved grating layer corresponding to the substrate and having the second curvature, so as to reduce crosstalk between view images;
   wherein, the curved substrate includes a plurality of sub-pixel sets arranged repeatedly, and, the curved grating layer includes a plurality of grating structures arranged repeatedly, wherein each of the plurality of grating structures corresponds to a respective one of the plurality of sub-pixel sets;
   the curved grating layer is a lenticular grating or an electronic liquid crystal lens configured such that a minimum distance between the curved substrate and the curved grating layer is equal to a focal length for the grating structure.

2. The display panel according to claim 1, wherein, the first curvature of the curved substrate is equal to or less than the second curvature of the curved grating layer.

3. The display panel according to claim 1, wherein, the grating structure includes two curved sides having the second curvature and, two linear sides that are in connection with the curved sides, end to end, to form a closed structure;

a length of the curved side of the grating structure is in a direct proportion to a distance within which the user can freely move in a horizontal direction with the view images being visible.

4. The display panel according to claim 3, wherein, each of the sub-pixel sets includes at least two sub-pixel units for displaying the view images, wherein, the sub-pixel unit includes two curved sides having the first curvature and, two linear sides that are in connection with the curved sides, end to end, to form a closed structure; summation of the lengths of the curved sides of the sub-pixel units in the sub-pixel set is in a direct proportion to the length of the curved side of the grating structure.

5. The display panel according to claim 4, wherein, the number of the view images that are displayed by the curved substrate is in a direct proportion to the distance within which the user can freely move in the horizontal direction with the view images being visible.

6. A display device, wherein, it comprises the display panel according to claim 1.

7. The display panel according to claim 1, wherein, the curved grating layer is one or more of a solid barrier grating, an active barrier grating, a lenticular grating and an electronic liquid crystal lens.

8. The display panel according to claim 1, wherein the curved grating layer comprises a plurality of lens each corresponding to a pixel.

* * * * *